United States Patent [19]
Horikawa et al.

[11] Patent Number: 5,463,003
[45] Date of Patent: Oct. 31, 1995

[54] PROCESS FOR POLYMERIZING CONJUGATED DIENES WITH LITHIUM-TIN-NITROGEN INITIATORS

[75] Inventors: Yasuo Horikawa; Toshiki Takizawa; Taro Akazawa, all of Tokyo, Japan

[73] Assignee: Bridgestone Corporation, Tokyo, Japan

[21] Appl. No.: 174,366

[22] Filed: Dec. 28, 1993

[30] Foreign Application Priority Data

Dec. 28, 1992 [JP] Japan .................................. 4-349412

[51] Int. Cl.$^6$ ............................. C08F 4/48; C08F 4/58; C08F 36/06
[52] U.S. Cl. .................. 526/176; 526/180; 526/217; 526/221; 526/236; 526/335; 526/340
[58] Field of Search .................................. 526/340, 176, 526/180

[56] References Cited

U.S. PATENT DOCUMENTS 3,426,006  2/1969  Nützel .................................. 526/190
5,268,439  12/1993  Hergenrother .......................... 526/340

OTHER PUBLICATIONS

Tamborski et al, J. Org. Chem., vol. 28, p. 238 (1963).

Gillman et al, Journal of American Chemical Society, vol. 75, p. 2507 (1953).

*Primary Examiner*—Fred Zitomer
*Attorney, Agent, or Firm*—Sughrue, Mion, Zinn, Macpeak & Seas

[57] ABSTRACT

A method for preparing a polymer having low hysteresis loss value and good breaking properties using a novel lithium initiator compound for polymerization of a conjugated diene and/or an aromatic vinyl hydrocarbon. Polymers produced in accordance with this method contain tin in an amount more than usual, and can be manufactured with good productivity.

24 Claims, No Drawings

PROCESS FOR POLYMERIZING CONJUGATED DIENES WITH LITHIUM-TIN-NITROGEN INITIATORS

FIELD OF THE INVENTION

The present invention relates to a process for preparing a polymer using a novel lithium initiator.

BACKGROUND OF THE INVENTION

Lately, rubbers used for tires must have reduced hysteresis loss values in order to reduce energy consumption. For that purpose, natural rubber, polyisoprene rubber, and polybutadiene rubbers (BR) are used because they have low hysteresis loss values.

Some synthetic polymers with very low hysteresis loss values are prepared by coupling after being formed by polymerization using organic lithium compounds, the coupling being carried out with halogenated tin compounds (JP-A-57-55912, etc.). These polymers have good properties, in particular, reduced energy consumption.

Another method for lowering the hysteresis loss value includes the use of polymers having amine group at the end of the chains (JP-A-50-79590, JP-A-52-22484, etc.). In this process, initiators, such as amide compounds of alkali metals or cyclic lithium imide compounds, are prepared separately before use. In these process, hysteresis loss values are lowered by introducing tin atoms in the polymers thorough coupling.

However, the methods described above require a coupling step after polymerization, which prevents continuous polymerization, therefore, reducing productivity.

SUMMARY OF THE INVENTION

An object of the present invention is to provide a method for preparing polymers having low hysteresis loss values and improved breaking strength with good productivity.

The process of the invention includes polymerization of a conjugated diene compound or copolymerization of a conjugated diene compound and an aromatic vinyl compound, with or without an inert hydrocarbon solvent, using an initiator compound including a secondary amino or an imino residue, tin, and lithium, wherein the initiator is a compound having either formula (A) or formula (B):

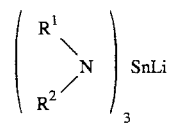
(A)

wherein $R^1$ and $R^2$ may be same or different and are each an aliphatic hydrocarbon group containing 1 to 20 carbon atoms, aromatic hydrocarbon group containing 5 to 20 carbon atoms, or cycloaliphatic hydrocarbon group containing 3 to 20 carbon atoms;

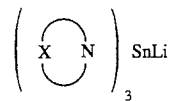
(B)

wherein X is one of the following hydrocarbon groups:

X-I: a saturated cyclic group having the formula $(CR^3R^4)_n$;

X-II: a saturated cyclic group having the formula $(CR^5R^6)_m$—Y—$(CR^5R^6)_l$; wherein Y is $NR^7$ or O, X-III: imine compounds having a carbon-carbon double bond, the ring preferably being a ring having the formula $(CR^3R^4)_n$ or $(CR^5R^6)_m$—Y—$(CR^5R^6)_l$, as discussed above;

wherein $R^3$, $R^4$, $R^5$ and $R^6$, which may be the same or different, each independently represents a hydrogen atom, or an aliphatic hydrocarbon group containing 1 to 10 carbon atoms, aromatic hydrocarbon group containing 5 to 10 carbon atoms, or cycloaliphatic hydrocarbon groups containing 3 to 10 carbon atoms, $R^7$ is an aliphatic hydrocarbon group containing 1 to 10 carbon atoms, aromatic hydrocarbon group containing 5 to 10 carbon atoms, or cycloaliphatic hydrocarbon group containing 3 to 10 carbon atoms, n is an integer between 3 and 10, and the sum of m and l is between 2 and 9.

With regard to the structure and reactivity of the tin compounds, the present inventors have found that the bond between the tin atom and the nitrogen atom of the initiator compound is activated and becomes an initiating site such that a polymer having a tin-carbon bond is obtained.

For example, when butadiene and styrene are polymerized randomly using an initiator in accordance with the present invention, a tin-nitrogen bond becomes the initial polymerizing site, and a high molecular weight random styrene-butadiene copolymer (SBR) is obtained as the polymerization proceeds. A vulcanized rubber compound made from a polymer prepared in accordance with the present invention has very low hysteresis loss value. Furthermore, the initiators of the present invention have improved stability under severe conditions such as high temperatures, which is very important when they are used in a plant having a high temperature. When conducting polymerization at high temperatures with amine-type initiators, reaction sites are gradually "killed" during the polymerization process.

In general, if an alkyl lithium is employed as an initiator, the resulting polymer includes one long chain and the original alkyl groups, but each of the polymers of the present invention has three long chains which indicates that polymerization occurs between tin and nitrogen. While not wishing to be bound by theory, it is believed that this ability to have the polymerization sites at the tin-nitrogen bond is due to the interaction between a compound having an amide-tin, an aryl-tin, or a benzyl-tin-type bond and stannyllithium.

As described above, an object of the present invention is to provide initiators which can be used to prepare end modified, high molecular weight polymers with reduced hysteresis loss values and better breaking strength with good productivity.

By the term "polymerization" as used herein is meant to include polymerization of a conjugated diene compound as well as copolymerization of a conjugated diene compound and an aromatic vinyl compound. Also, by the term "polymer" is meant to include a polymer of a conjugated diene compound as well as a copolymer of a conjugated diene compound and an aromatic vinyl compound.

DETAILED DESCRIPTION OF THE INVENTION

Initiator compounds in accordance with the present invention include a secondary amino group, tin and lithium and may be represented by formulae (A) and (B):

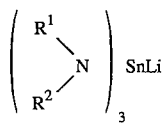
(A)

wherein $R^1$ and $R^2$, which may be the same or different, each represents an aliphatic hydrocarbon group containing 1 to 20 carbon atoms, aromatic hydrocarbon group containing 5 to 20 carbon atoms, or cycloaliphatic hydrocarbon group having 3 to 20 carbons;

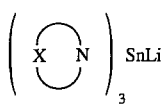
(B)

wherein X is one of the following:

X-I: a saturated cyclic group having the formula $(CR^3R^4)_n$;

X-II: a saturated cyclic group having the formula $(CR^5R^6)_m$—Y—$(CR^5R^6)_l$; wherein Y is $NR^7$ or O, X-III: imine compounds having a carbon-carbon double bone, the ring preferably being a ring having the formula $(CR^3R^4)_n$ or $(CR^5R^6)_m$—Y—$(CR^5R^6)_l$, as discussed above; wherein $R^3$, $R^4$, $R^5$ and $R^6$ each independently represents a hydrogen atom, an aliphatic hydrocarbon group containing 1 to 10 carbon atoms, aromatic hydrocarbon group containing 5 to 10 carbon atoms, or a cycloaliphatic hydrocarbon group containing 3 to 10 carbon atoms, $R^7$ is an aliphatic hydrocrbon group containing 1 to 10 carbon atoms, aromatic hydrocarbon group containing 5 to 10 carbon atoms, or cycloaliphatic hydrocarbon group containing 3 to 10 carbon atoms, n is an infinite number between 3 and 10, and m and l are each infinite numbers, the sum of which is between 2 and 9.

The initiators in accordance with formula (A) above are compounds which include a secondary amino residue, tin and lithium, wherein, preferably, each of $R^1$ and $R^2$ are an aliphatic hydrocarbon group containing 1 to 10 carbon atoms, aromatic hydrocarbon group containing 5 to 10 carbon atoms, or cycloaliphatic hydrocarbon group containing 3 to 10 carbon atoms.

Any suitable secondary amine may be used in the present invention. Examples of suitable secondary amines include dimethylamine, diethylamine, dipropylamine, di-n-butylamine, diisobutylamine, dipentylamine, dihexylamine, diheptylamine, dioctylamine, diarylamine, dicyclohexylamine, butylisopropylamine, dibenzylamine, methylbenzylamine, methylhexylamine and ethylhexylamine. Other suitable secondary amines will be apparent to one skilled in the art.

The initiators in accordance with formula (B) are compounds which include an imine residue, tin and lithium.

Any suitable imine compound which forms a nitrogen containing ring may be used to form the imine residue including:

a) imine compounds having the formula $(CR^3R^4)_n$ where preferably, $R^3$ and $R^4$ are each hydrogen atoms or aliphatic hydrocarbons containing 1 to 8 carbon atoms, and n is 3 to 10, more preferably, $R^3$ and $R^4$ are each hydrogen atoms or aliphatic hydrocarbons containing 1 to 5 carbon atoms, and n is 3 to 8. Examples of imine compounds in this category include the following: ethyleneimine, propyleneimine, pyrrolidine, piperidine, 2-methylpiperidine, 3-methylpiperidine, hexamethyleneimine, heptamethyleneimine and coniine;

b) imine compounds having the formula $(CR^5R^6)_m$—Y—$(CR^5R^6)_l$ where preferably, $R^5$ and $R^6$ are each hydrogen atoms or aliphatic hydrocarbons containing 1 to 5 carbon atoms, $R^7$ is an aliphatic hydrocarbon containing 1 to 5 carbon atoms, and the sum of m and l is 3 to 5, more preferably, $R^5$ and $R^6$ are each hydrogen atoms, $R^7$ is an aliphatic hydrocarbon containing 1 to 5 carbon atoms, and the sum of m and l is 3 to 5. Examples of compounds in this category are morpholine, N-methylpiperazine, N-ethylpiperadine, N-methylimidazolidine and N-ethylimidazolidine; and c) imine compounds having a carbon-carbon double bond, the ring preferably being a ring having the formula $(CR^3R^4)_n$ or $(CR^5R^6)_m$—Y—$(CR^5R^6)_l$, as discussed above. Examples of initiators in this category include oxazine, pyrroline, pyrrole and azepine.

The initiators in accordance with the present invention may include a secondary amino or an imino residue, tin and lithium, as discussed above. Any suitable compounds which is obtained by reacting any combination of a secondary amine compound or an imine compound, a tin compound, and a lithium compound at any step during the preparation process can be used without isolating it. For example, tin dichloride may be reated with the reaction mixture of pyrrolidine and n-butyl lithium.

The amount of the available initiator for polymerization in accordance with the present invention is preferably 0.1 to 20 millimoles per 100 g of total monomer. The amount of initiator used affects the molecular weight of the resulting polymer. With higher levels of initiator, the molecular weight of the resulting polymer is reduced and the amount of tin-carbon linkages per polymer chain is increased. With lower levels of initiator, the molecular weight is increased and the amount of tin-carbon linkages per polymer chain is reduced. This affects the physical properties of the resulting polymers and, further, the vulcanite. More preferably, the initiator level is 0.1 to 5 millimoles per 100 g of total monomer, more preferably, 0.1 to 1.0 millimole per 100 g of total monomer, and more preferably, 0.1 to 0.4 millimole per 100 g of total monomer. If the amount exceeds 20 millimoles per 100 g of total monomer, the molecular weight of a polymer having a tin-carbon linkage becomes too high, which leads to an unfavorable increase in hysteresis loss values. If the amount is less than 0.1 millimole per 100 g of total monomer, the molecular weight of the resulting polymer become too high and miscibility with carbon black during compounding is reduced to an unacceptable level.

Any suitable solvent may be used in the polymerization in accordance with the invention. For example, the solvents may be: aromatic hydrocarbons, such as benzene, toluene and xylene; aliphatic hydrocarbons, such as n-pentane, n-hexane and n-butane; and cycloaliphatic hydrocarbons, such as methylcyclopentane and cyclohexane; or mixtures of the foregoing.

Monomers for polymerization in accordance with the present invention include conjugated dienes and vinyl aromatic hydrocarbons.

Any suitable conjugate diene may be used in the present invention. The conjugated dienes can preferably contain 4 to 12 carbon atoms, more preferably, 4 to 8 carbon atoms, such as 1,3-butadiene, isoprene, piperilene, 2,3-dimethyl-1,3-butadiene, 1,3-pentadiene and octadiene. These monomers can be polymerized alone or a mixture of two or more monomers may be polymerized. Preferably, the conjugated diene is 1,3-butadiene.

Any suitable vinyl aromatic hydrocarbon may be used in the present invention. The vinyl aromatic hydrocarbon preferably is styrene, α-methylstyrene, p-methylstyrene, o-methylstyrene, p-butylstyrene or vinyl naphthalene, and more preferably is styrene.

In the present invention, a Lewis base, such as an ether compound or a tertiary amine compound, can be used in order to improve polymerization activity and/or to control the molecular structure of the resulting polymer in order to prepare a polymer suitable for a particular use.

Any suitable ether compound may be used in the present invention, including, for example, diethylether, dibutylether, tetrahydrofuran, 2-methoxytetrahydrofuran, 2-methoxyethyltetrahydrofuran, dioxane, ethyleneglycoldimethylether, ethyleneglycoldimethylether, di-ethyleneglycoldiethylether, diethyleneglycoldibutylether and triethyleneglycoldiethylether. Any suitable tertiary amine may be used in the present invention including, for example, triethylamine, tripropylamine, pyridine, N,N,N',N'-tetramethylethylenediamine, N,N,N',N'-tetraethylethylenediamine and N-methylmorpholine.

The amount of the ether compound or tertiary amine compound used is not critical and can be 0.05 to 1,000 millimoles per 1 mole of organolithium.

In the present invention, a tin compound, a compound including an isocyanate group, and/or a compound having a —CM—N< linkage, where M represents a sulfur atom or an oxygen atom, can be added to the reaction mixture after completing polymerization, as a modifier in an amount of 0.05 to 0.5 mole equivalent per charged initiator (which is to be described as "mol.eq./I"), more preferably, 0.1 to 0.2 mol.eq./I, or can be added when it is desired to quench polymerization or change the molecular structure of the resulting polymer in order to achieve desired properties in an amount of 0.05 to 0.5 mol.eq./I, more preferably, 0.1 to 0.2 mol.eq./I.

Any suitable tin compound can be used in the present invention including, for example, halogenated tin compounds, such as tin tetrachloride and tin tetrabromide, and halogenated organotin compounds, such as diethyltin dichloride, dibutyltin dichloride, tributyltin chloride, diphenyltin dichloride and triphenyltin chloride.

Any suitable compound containing a isocyanate group may be used in the present invention including, for example, aromatic polyisocyanate compounds, such as phenylisocyanate, 2,4-tolylenediisocyanate, 2,6-tolylenediisocyanate, diphenylmethanediisocyanate, naphthalenediisocyanate and dimers or trimers of these compounds.

Any suitable compound containing the linkage mentioned above may be used in the present invention including, for example, amide compounds, such as formamide, N,N-dimethylformamide, acetamide, N,N-dimethylformamide, acetamide, N,N-dimethylaminoacetamide, N,N-dimethyl-N',N'-dimethylaminoacetamide, N,N-dimethylaminoacetamide, N,N-dimethyl-N'-ethylaminoacetamide, acrylamide, N,N-dimethylacrylamide, N,N-dimethylmethacrylamide, nicotinamide, isonicotinamide, picolinic acid amide, N,N-dimethylisonicotinamide, succinic acid amide, phthalic acid amide, N,N,N',N'-tetramethylphthalic acid amide, oxamide, N,N,N',N'-tetramethyloxamide, 1,2-cyclohexanedicarboxyimide, 2-furan carbonic acid amide, N,N-dimethyl-2-furan carboxylic acid amide, quinoline-2-carboxylic acid amide and N-ethyl-N-methylquinoline carboxylic acid amide; imide compounds, such as succinic imide, N-methylsuccinic imide, maleimide, phthalimide and N-methylphthalimide; lactam compounds, such as ε-caprolactam, N-methyl-ε-caprolactam, 2-pyrrolidone, N-methyl-2-pyrrolidone, 2-piperidone, N-methyl-2-piperidone, 2-quinorlone and N-methyl-2-quinorlone; urea compounds, such as urea, N,N'-dimethyl urea, N,N'-diethyl urea, N,N,N',N'-tetramethyl urea, N,N-dimethyl-N',N'-diphenyl urea and N,N'-dimethylethylene urea; carbamic acid derivatives, such as methyl carbamate and N,N-dimethyl methyl carbamate; isocyanuric acid derivatives, such as isocyanuric acid and N,N',N''-trimethylisocyanuric acid. In general, any compound which reacts with the active ends of the polymer can be used as a modifier in accordance with the present invention.

The reaction temperature in accordance with the invention is preferably −20° to 150° C. more preferably, 0° to 100° C.

Polymerization in accordance with the invention can be carried out in a solution or in bulk, by batchwise or continuously.

The monomer concentration in polymerization solvent is preferably 5 to 50 wt %, more preferably, 10 to 35 wt %.

If a mixture of a conjugated diene and an aromatic vinyl hydrocarbon is copolymerized, the aromatic vinyl hydrocarbon monomer is preferably 3 to 50 wt % of the feed monomer, more preferably 5 to 40 wt %, the conjugated diene being the remainder.

Polymerization in accordance with the invention is preferably carried out under high enough pressure, for example, 1 to 10 atm., to maintain the system in liquid phase since the reaction starts by contact of the monomer with the initiator in liquid phase. All the additives described above are preferably purified before use.

After the polymerization, if it is carried out in a solution, solvent may be removed from the polymer by stream stripping or drying the polymer solution using hot rollers or reduced pressure with or without previously solidifying the polymers.

The polymers prepared in accordance with the present invention have a high tin-carbon linkage content, i.e., 20 wt % to 90 wt %, more preferably, 50 wt % to 80 wt %. The higher tin-carbon linkage content improves the properties of the resulting polymer.

Preferably, the number average molecular weight of the polymer in accordance with the invention is at least $10 \times 10^4$, more preferably, at least $20'10^4$. The final molecular weight of total polymers including the high molecular weight polymers containing a tin-carbon linkage can be controlled easily according to particular uses, but generally, it is said that $5 \times 10^4$ to $150 \times 10^4$ are more useful.

When the polymer in accordance with the invention is a butadiene rubber or a styrene-butadiene rubber, the microstructure of the butadiene rubber or butadiene portion in the styrene-butadiene rubber may be cis-1,4-, trans-1,4-, or vinyl. Also, in the styrene-butadiene rubber the distribution of butadiene to styrene may be random, block or a mixture thereof, according to the particular use of the rubber.

The polymer in accordance with the present invention, which, as mentioned above, may be a styrene-butadiene rubber can be the sole rubbery component of a rubber composition or can be blended with natural rubber, or other synthetic rubbers. The styrene-butadiene rubber can be oil-extended, if desired, and vulcanized with conventional vulcanizing agents. Vulcanites of polymers in accordance with the invention are suitable for use as a tires, rubber vibration isolators, belts, hoses, and for other industrial uses.

The present invention is explained more in detail through the examples, but is not limited by them.

In the examples, parts and percentages are by weights unless noted otherwise.

Measurements were made as follows.

Number average molecular weight of the polymers were measured by gel permeation chromatography (G.P.C.) and calculated by differential refractive index (RI) and UV absorption at 254 nm.

The results of measurement of G.P.C. of the polymer in accordance with the invention showed that a high molecular weight polymer component and a low molecular weight polymer component existed. The ratio of the amounts of the two polymer components was obtained from the ratio of the peak areas obtained by using the RI detector of G.P.C.

It is known that butadiene rubber containing a chain having a tin-carbon linkage has strong UV absorption due to the structure of the tin-polymer linkage, and butadiene rubber containing no tin-carbon linkages has almost no UV absorption.

On the other hand, styrene-butadiene rubber has very strong UV absorption due to the styrene units and cannot be analyzed with a UV detector. However, since the conditions can be considered to be similar to those of butadiene rubbers, it can be considered that the high molecular weight polymer component is the polymer containing the chain having the tin-carbon linkage and the low molecular weight polymer component is the polymer containing no chain having the tin-carbon linkage.

By making use of this characteristic, the structure of the polymer of the present invention was analyzed by a UV detector and G.P.C., and it was found that the higher molecular weight polymer had the UV absorption described above while the low molecular weight polymer did not. Therefore, it was concluded that the high molecular weight polymer component was a polymer having tin-carbon linkages and the low molecular weight polymer component did not include such linkages.

From the analysis described above, the number average molecular weight and the amounts of the polymers, with or without tin-carbon linkage were obtained.

The microstructure of butadiene rubber or the butadiene portion of the styrene butadiene rubber was analyzed by the infrared method according to D. Morero, *Chem. e. Ind.*, Vol. 41, page 758 (1959). The amount of styrene was obtained from the calibration line of the infrared method based on the absorption of the phenyl group at 699 cm$^{-1}$.

It is known that when an organolithium initiator is used, even though the solvent and the other reagents used for polymerization are purified beforehand, part of the initiator becomes deactivated by impurities, such as water or carbon dioxide in the system. Accordingly, a lithium compound which does not participate in initiation, may be added as a scavenger in order to deactivate those impurities and use the initiator efficiently. The lithium in the initiator in the present invention is more sensitive to impurities in the system than those in ordinary organolithium compounds, so scavengers may be added to the system beforehand to deactivate the impurities.

The amount of scavenger may be calculated as described below.

In general, in the polymerization of conjugated dienes and/or vinyl aromatic hydrocarbons with an organolithium initiator, the molecular weight distribution is as narrow as 1.1 and the number average molecular weight (Mn) of the resulting polymer satisfies the following equation (*Experimental Method of Polymer Synthesis*, T. Ohtsu, P212, Kagakudojin).

Mn = (moles of the monomer/moles of the available organolithium initiator) × (molecular weight of the monomer)   Equation A It has been found that Equation B (below) substantially holds in the polymerizations of the present invention. When solvents or monomers from the same lots are used in the same reactor, the concentration of organolithium initiator follows Equation B.

(Concentration of Li atoms at the active ends of the polymers) = (moles of the organolithium compound charged at the beginning of the polymerization) − (moles of the organolithium compound deactivated by impurities)   Equation B This equation has been used industrially and empirically and has been proved to be valid objectively. A series of experiments were carried out before starting the polymerization of the present invention in order to find the amount of organolithium initiators deactivated by impurities, that is, the amount of lithium which should be added as a scavenger.

The amount of scavenger is measured by following process.

In a 5 l of reactor, 1500 g of hexane, 200 g of butadiene, 50 g of styrene, and 2.0 g of tetrahydrofuran were fed. After temperature in the reactor was accurately controlled at 60° C., sec.-BuLi was added dropwise very slowly. When the temperature changed slightly, amount of sec.-BuLi was measured. This amount was used as the amount of scavenger.

The index of the hysteresis loss values used was tanδ. The lower the index is, the more improved the low hysteresis loss property becomes. To measure tanδ, an apparatus for measurement of viscoelasticity (manufactured by Rheomertrics Inc.) was used. The conditions under which the measurement was carried out were a temperature of 50° C., strain at 1%, and a frequency of 15 Hz. The tensile properties were measured according to Japanese Industrial Standard K6301.

EXAMPLE 1

(A) Preparation of Initiator

To obtain lithiumpyrrolidide, 0.3 moles of pyrrolidine and 0.3 moles of hexane solution of n-butyl lithium were added to an argon purged glass vessel at room temperature while being stirred (yield was 97%). 18.4 g of tin dichloride in 60 g of tetrahydrofuran were added to 22.4 g of the lithiumpyrrolidide to obtain a reaction mixture containing tripyrrolididestannyllithium. $^{119}$Sn—NMR and 7Li—NMR of obtained tripyrrolididestannyllithium were measured in tetrahydrofuran to observe chemical shifts. Tetramethyl tin and lithium chloride were used as standards, respectively. The analysis of these chemical shifts and reaction mechanisms of starting materials indicated that the resulting compounds have both Sn—N and Sn—Li linkages.

(B) Polymerization 1500 g of cyclohexane, 200 g of 1,3-butadiene, and 50 g of styrene were added to a 5 l reactor having a stirring device. After the temperature in the reactor reached 60° C., 0.037 g of n-butyl lithium was added as scavenger to eliminate impurities in the system. Then the reaction mixture of (A) was added to start polymerization, the amount of the mixture was 0.187 g tripyrrolididestannyllithium. Polymerization was carried out at 60° C. for 120 minutes and terminated with isopropanol.

Rubbery polymers were obtained by drying the solids at 100° C. with a hot roller after adding 2.5 g of 2,6-di-tert-butyl-p-cresol and then steam stripping. The properties of the resulting polymers are shown in Table 1.

A polymer composition was formulated as shown in Table 3 by mixing the polymer obtained with additives in a Labprastomill having 3 inch rolls, and then vulcanized at 145° C. for 35 min. The properties of the resulting rubber composition are shown in Table 2.

EXAMPLES 2 AND 3

Examples 2 and 3 were carried out by the same method as in Example 1 except that the amount of tripyrrolididestannyllithium was changed to 0.156 g and 0.134 g, respectively. The properties of the resulting polymers and polymer compositions are shown in Table 1 and Table 2, respectively.

EXAMPLE 4

(A) Preparation of Initiator 0.3 moles of hexamethyleneimine and 0.3 moles of hexane solution of n-butyl lithium were fed while being stirred to an argon purged glass vessel at room temperature to obtain lithiumhexamethyleneimide (yield 97%). 18.4 g of tin dichloride in 60 g of tetrahydrofuran was added gradually to 30.6 g of the lithiumhexamethyleneimide to obtain a reaction mixture containing trihexamethyleneimidestannyllithium.

(B) Polymerization and Compounding of Resulting Polymers

Polymerization and compounding of polymers obtained were carried out by the same method as in Example 1 except 0.233 g of trihexamethyleneimidestannyllithium was used instead of 0.187 g of tripyrrolididestannyllithium. Properties of the resulting polymer and resulting polymer composition are shown in Table 1 and Table 2, respectively.

EXAMPLES 5 AND 6

Examples 5 and 6 were carried out by the same method as in Example 4 except that the amount of trihexamethyleneimidestannyllithium was varied to 0.195 and 0.160, respectively. The properties of the resulting polymers and resulting polymer compositions are shown in Table 1 and Table 2, respectively.

EXAMPLE 7

(A) Preparation of Initiator 0.3 mole of diethylamine and 0.3 mole of hexane solution of n-butyl lithium were added while being stirred to an argon purged glass vessel at room temperature to obtain lithiumdiethylamide (yield 98%). 18.5 g of tin dichloride in 60 g of tetrahydrofuran was added gradually to 23.54 g of the lithiumdiethylamide to obtain a reaction mixture containing tri(diethyl)amidestannyllithium.

(B) Polymerization and Mixing of Resulting Polymer

Polymerization and polymer mixing were carried out by the same method as in Example 1 except 0.172 g of tri(diethyl)amidestannyllithium was used instead of 0.187 g of tripyrrolididestannyllithium. The properties of the resulting polymer and the resulting polymer composition are shown in Table 1 and Table 2, respectively.

EXAMPLE 8

(A) Preparation of Initiator 0.3 mole of dipropylamine and 0.3 mole of hexane solution of n-butyl lithium were added while being stirred to an argon purged glass vessel at room temperature to obtain lithiumdipropylamide (yield 98%). 18.5 g of tin dichloride in 60 g of tetrahydrofuran was added gradually to 31.5 g of the lithiumdipropylamide to obtain a reaction mixture containing tri(dipropyl)amidestanyllithium.

(B) Polymerization and Mixing of Resulting Polymer

Polymerization and polymer mixing were carried out by the same method as in Example 1 except 0.214 g of tri(dipropyl)amidestannyllithium was used instead of 0.187 g of tripyrrolididestannyllithium. The properties of the resulting polymer and0 the resulting polymer composition are shown in Table 1 and Table 2, respectively.

COMPARATIVE EXAMPLE 1

Comparative Example 1 was carried out by the same method as in Example 1, except in order to start polymerization, 1.20 g of tetrahydrofuran was added to the reactor and 0.114 g of n-butyl lithium was added. Polymerization was carried out at 60° C. for 120 minutes and terminated with isopropanol.

The properties of the resulting polymer and the resulting rubber composition obtained are shown in Table 1 and Table 2, respectively.

COMPARATIVE EXAMPLE 2

Comparative Example 2 was carried out by the same method as in Comparative Example 1, except that when the conversion reached 100%, tin tetrachloride was added until the solvent became colorless. The properties of the resulting polymers and the resulting polymer compositions are shown in Table 1 and Table 2, respectively.

TABLE 1

| | Properties of Polymers | | | | | |
| --- | --- | --- | --- | --- | --- | --- |
| | Mn ($\times 10^4$) | | | Amount of Sn—C Linkage Containing Polymers (%) | Amount of Vinyl in Butadiene Portion (%) | Amount of Bonded Styrene (%) |
| | Total Polymer | Polymers Without Sn—C Linkages | Sn—C Linkage Containing Polymers | | | |
| E-1 | 24 | 13 | 47 | 81 | 38 | 21 |
| E-2 | 42 | 15 | 56 | 84 | 37 | 21 |

TABLE 1-continued

| | Properties of Polymers | | | | | |
|---|---|---|---|---|---|---|
| | Mn (× 10⁴) | | | Amount of Sn—C Linkage Containing Polymers (%) | Amount of Vinyl in Butadiene Portion (%) | Amount of Bonded Styrene (%) |
| | Total Polymer | Polymers Without Sn—C Linkages | Sn—C Linkage Containing Polymers | | | |
| E-3 | 46 | 18 | 62 | 82 | 36 | 20 |
| E-4 | 32 | 15 | 45 | 80 | 38 | 22 |
| E-5 | 38 | 17 | 53 | 80 | 40 | 22 |
| E-6 | 48 | 21 | 67 | 81 | 40 | 21 |
| E-7 | 32 | 16 | 46 | 80 | 46 | 23 |
| E-8 | 35 | 17 | 49 | 80 | 47 | 20 |
| CE-1 | 19 | 19 | — | — | 40 | 21 |
| CE-2 | 50 | 19 | 72 | 67 | 40 | 20 |

Notes:
E: Examples
CE: Comparative Examples

TABLE 2

| | Properties of Vulcanites | | |
|---|---|---|---|
| | Elongation (%) | Tensile Strength (%) | tanδ at 50° C. |
| E-1 | 410 | 235 | 0.093 |
| E-2 | 410 | 243 | 0.086 |
| E-3 | 433 | 262 | 0.079 |
| E-4 | 424 | 238 | 0.092 |
| E-5 | 437 | 246 | 0.086 |
| E-6 | 432 | 251 | 0.083 |
| E-7 | 451 | 232 | 0.090 |
| E-8 | 450 | 226 | 0.089 |
| CE-1 | 375 | 205 | 0.125 |
| CE-2 | 407 | 231 | 0.098 |

Notes:
E: Examples
CE: Comparative Examples

TABLE 3

| Polymer | 100 parts |
|---|---|
| Carbon black (HAF) | 50 |
| Stearic acid | 2 |
| Spindle Oil | 5 |
| Antioxidant (6C*¹) | 1 |
| ZnO₂ | 3 |
| Accelerator (DPG*²) | 0.5 |
| Accelerator (DM*³) | 1.0 |
| Sulfur | 1.5 |

Notes:
*1 N-(1,3-Dimethylbutyl)-N'-phenyl-p-phenylenediamine
*2 Diphenylguanidine
*3 Dibenzothiazyldisulfide As shown in Table 1, polymers prepared in accordance with the present invention using organoamide stannyllithium have high molecular weights and contain higher amounts of tin-carbon linkages compared to those of polymers modified after the completion of polymerization with tin tetrachloride in order to increase the amount of tin in the polymers.

Furthermore, as shown in Table 2, vulcanites of the present invention have much better properties compared to polymers prepared by a process in which no tin compounds were added (Comparative Example 1). They also have better elongation, tensile strength, and tanδ which improve with increased amount of the initiators.

This is a tendency which can be seen in all cases without any connection to the types of secondary amines.

As described in this specification, polymers are prepared having better breaking properties, reduced hysteresis loss, better balanced properties and containing more tin without additional coupling steps.

Moreover, the method of the present invention provides polymers having reduced hysteresis loss, with good productivity.

While the invention has been described in detail and with reference to specific embodiments thereof, it will be apparent to one skilled in the art that various changes and modifications can be made therein without departing from the spirit and scope thereof.

What is claimed is:

1. A process for preparing a polymer selected from the group consisting of a conjugated diene homopolymer and a conjugated diene-aromatic vinyl hydrocarbon copolymer, comprising the step of polymerizing a mixture of: (a) an initiator compound containing a secondary amino or an imino group, tin and lithium; and (b) a conjugated diene monomer or a conjugated diene monomer and an aromatic vinyl hydrocarbon monomer; wherein the initiator has a formula selected from the group consisting of formula (A) and formula (B):

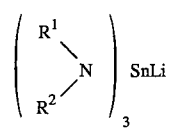
(A)

wherein $R^1$ and $R^2$ each independently represents an aliphatic hydrocarbon group containing 1 to 20 carbon atoms, an aromatic hydrocarbon group containing 5 to 20 carbon atoms, or a cycloaliphatic hydrocarbon group containing 3 to 20 carbon atoms;

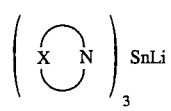
(B)

wherein X represents:

a saturated cyclic group having the formula $(CR^3R^4)_n$;
a saturated cyclic group having the formula $(CR^5R^6)_m$—Y—$(CR^5R^6)_l$,
wherein Y represents $NR^7$ or O; or
imine compounds having a carbon-carbon double bond;
wherein $R^3$, $R^4$, $R^5$ and $R^6$ each independently represents hydrogen or an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, $R^7$ is an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, n represents an integer between 3 and 10, and the sum of m and l is between 2 and 9.

2. The process according to claim 1, wherein $R^3$ and $R^4$ each represents a hydrogen atom or an aliphatic hydrocarbon group containing 1 to 8 carbon atoms.

3. The process according to claim 1, wherein $R^3$ and $R^4$ each represents a hydrogen atom or an aliphatic hydrocarbon group containing 1 to 5 carbon atoms, and n represents an integer between 3 to 8.

4. The process according to claim 1, wherein $R^5$ and $R^6$ each represents a hydrogen atom or an aliphatic hydrocarbon group containing 1 to 5 carbon atoms, $R^7$ represents an aliphatic hydrocarbon group containing 1 to 5 carbon atoms, and the sum of m and l is 3 to 5.

5. The process according to claim 1, wherein $R^5$ and $R^6$ each represents a hydrogen atom, and $R^7$ represents an aliphatic hydrocarbon containing 1 to 5 carbon atoms, and the sum of m and l is 3 to 5.

6. The process according to claim 1, wherein the amount of available initiator present during the contacting step is 0.1 to 20 millimoles per 100 g of total monomer.

7. The process according to claim 6, wherein the amount of available initiator present during the contacting step is 0.1 to 5 millimoles per 100 g of total monomer.

8. The process according to claim 1, wherein the conjugated diene monomer is butadiene.

9. The process according to claim 1, wherein the conjugated diene monomer is butadiene and the aromatic vinyl hydrocarbon monomer is styrene.

10. The process according to claim 1, wherein the conjugated diene monomer is a mixture of butadiene and isoprene and the aromatic vinyl hydrocarbon monomer is styrene.

11. The process according to claim 1, further comprising the step of adding a Lewis base to the mixture.

12. The process according to claim 11, wherein the Lewis base is selected from the group consisting of an ether compound and a tertiary amine compound.

13. The process according to claim 11, wherein the Lewis base is added to the mixture in an amount of 0.05 to 1,000 millimoles per mole of initiator.

14. The process according to claim 1, further comprising the step of modifying the polymer after completing polymerization by contacting the polymer with at least one compound selected from the group consisting of a tin compound, a compound containing an isocyanate group, and a compound containing a —CM—N< linkage, where M represents a sulfur atom or an oxygen atom.

15. The process according to claim 14, wherein the modifier is a compound selected from the group consisting of a halogenated tin compound, a halogenated organotin compound, an aromatic polyisocyanate compound, an amide compound, an imide compound, a lactam compound, a urea compound, a carbamic acid derivative, an isocyanuric acid derivative and a thiocarbonyl compound.

16. The process according to claim 15, wherein the modifier is a compound selected from the group consisting of tin tetrachloride, dibutyltin dichloride, tributyltin chloride, phenylisocyanate, formamide, succinicimide, ε-caprolactam, urea, carbamic acid and isocyanuric acid.

17. The process according to claim 1, wherein the polymerization is carried out until the polymer has a number average molecular weight of at least $10 \times 10^4$.

18. The process according to claim 1, wherein the polymerization is carried out until the polymer has a number average molecular weight $20 \times 10^4$ to $150 \times 10^4$.

19. The process according to claim 1, wherein the polymerization is carried out at a temperature of $-20°$ to $150°$ C.

20. The process according to claim 1, wherein the polymerization is carried out at a solution monomer concentration of 5 to 50 wt %.

21. The process according to claim 1, wherein the polymerization is carried out in an inert solvent.

22. The process according to claim 1, wherein the polymerization is carried out in bulk.

23. The process according to claim 1, wherein $R^1$ and $R^2$ each independently represents an aliphatic hydrocarbon group containing 1 to 20 carbon atoms, an aromatic hydrocarbon group containing 5 to 20 carbon atoms, cycloaliphatic hydrocarbon group containing 3 to 20 carbon atoms.

24. The process according to claim 1, wherein X forms a ring having the formula $(CR^3R^4)_m$ or $(CR^5R^6)_m$—Y—$(CR^5R^6)_l$.

* * * * *